(12) United States Patent
Valli et al.

(10) Patent No.: US 11,786,917 B2
(45) Date of Patent: Oct. 17, 2023

(54) DEVICE AND METHOD FOR FLUID PURIFICATION

(71) Applicant: Filtrabit Oy, Oulu (FI)

(72) Inventors: Veikko Valli, Oulu (FI); Lauri Hekkala, Oulu (FI)

(73) Assignee: Filtrabit Oy, Oulu (FI)

( * ) Notice: Subject to any disclaimer, the term of this patent is extended or adjusted under 35 U.S.C. 154(b) by 171 days.

(21) Appl. No.: 17/413,593

(22) PCT Filed: Dec. 11, 2019

(86) PCT No.: PCT/FI2019/050883
§ 371 (c)(1),
(2) Date: Jun. 14, 2021

(87) PCT Pub. No.: WO2020/120839
PCT Pub. Date: Jun. 18, 2020

(65) Prior Publication Data
US 2022/0032325 A1 Feb. 3, 2022

(30) Foreign Application Priority Data

Dec. 12, 2018 (EP) ..................................... 18397532

(51) Int. Cl.
*B01D 45/16* (2006.01)
*B04C 3/06* (2006.01)
*B04C 3/00* (2006.01)

(52) U.S. Cl.
CPC ................ *B04C 3/06* (2013.01); *B01D 45/16* (2013.01); *B04C 2003/006* (2013.01)

(58) Field of Classification Search
CPC ...... B04C 3/06; B04C 2003/006; B01D 45/16
See application file for complete search history.

(56) References Cited

U.S. PATENT DOCUMENTS

| 2,147,671 | A | * | 2/1939 | Pratt | ...................... | B01D 45/16 |
| | | | | | | 55/DIG. 28 |
| 2,574,370 | A | | 11/1951 | Bailey | | |
| 3,577,728 | A | * | 5/1971 | Von Brimer | .............. | F01N 3/26 |
| | | | | | | 60/303 |

(Continued)

FOREIGN PATENT DOCUMENTS

| CN | 101678257 A | 3/2010 |
| DE | 241042 C | 11/1911 |

(Continued)

*Primary Examiner* — Dung H Bui
(74) *Attorney, Agent, or Firm* — Laine IP Oy

(57) ABSTRACT

A device is provided for separating solid particles or liquid droplets from a fluid. The device comprises an entry tube having an inlet port for receiving a fluid flow and a vortex section, the diameter of which decreases in the flow direction. The vortex section comprises at least one internal wall forming at least one helical channel. The helical channel preferably surrounds a core body extending along a central axis of the entry tube. The varying diameter end sections of the core body preferably have a conical shape. The device further comprises an annular exit port section having at least one peripheral exit opening, and an outlet tube extending along the central axis. According to an embodiment, the device is provided with a pre-separation unit in the form of a cyclone.

14 Claims, 4 Drawing Sheets

(56) References Cited

U.S. PATENT DOCUMENTS

| | | | | |
|---|---|---|---|---|
| 3,713,280 A * | 1/1973 | Keller | B01D 45/12 | 55/435 |
| 3,895,930 A * | 7/1975 | Campolong | B04C 3/00 | 55/423 |
| 4,162,906 A * | 7/1979 | Sullivan | B04C 3/00 | 210/512.1 |
| 4,272,258 A * | 6/1981 | Shifflett | B01D 19/0052 | 96/204 |
| 4,289,611 A * | 9/1981 | Brockmann | B04C 3/06 | 209/710 |
| 4,311,494 A * | 1/1982 | Conner | F02M 35/022 | 55/394 |
| 4,537,608 A * | 8/1985 | Koslow | B01D 50/20 | 55/347 |
| 4,629,481 A * | 12/1986 | Echols | B04C 3/04 | 122/34 |
| 4,859,347 A * | 8/1989 | Simon | B04C 11/00 | 210/512.1 |
| 4,971,603 A * | 11/1990 | Prinsloo | B04C 3/06 | 55/345 |
| 4,985,058 A * | 1/1991 | Prinsloo | B04C 3/06 | 55/396 |
| 5,403,367 A * | 4/1995 | De Villiers | B01D 39/163 | 55/320 |
| 5,431,228 A | 7/1995 | Weingarten et al. | | |
| 5,531,811 A * | 7/1996 | Kloberdanz | C10G 5/00 | 96/216 |
| 5,570,744 A | 11/1996 | Weingarten et al. | | |
| 5,902,378 A * | 5/1999 | Obrejanu | E21B 43/38 | 96/204 |
| 7,931,719 B2 * | 4/2011 | Sams | B01D 45/12 | 55/456 |
| 8,110,024 B2 * | 2/2012 | Folkvang | B01D 19/0057 | 96/182 |
| 8,177,872 B2 * | 5/2012 | Nelson | B01D 45/16 | 55/447 |
| 8,425,641 B2 * | 4/2013 | Chaudhari | B01D 50/20 | 55/346 |
| 2008/0016832 A1 * | 1/2008 | Krisko | B01D 46/525 | 55/342 |
| 2010/0275561 A1 * | 11/2010 | Lundquist | B04C 3/06 | 524/570 |
| 2015/0231647 A1 * | 8/2015 | Madsen | B04B 1/20 | 494/66 |
| 2017/0072352 A1 * | 3/2017 | Meister-Place | B01D 45/12 | |
| 2018/0016944 A1 * | 1/2018 | Buhler | B01D 46/4281 | |
| 2018/0250620 A1 * | 9/2018 | Vingelven | B01D 45/08 | |

FOREIGN PATENT DOCUMENTS

| | | |
|---|---|---|
| DE | 10148405 A1 | 4/2003 |
| DE | 202012002963 U1 | 4/2012 |
| EA | 5727 B1 | 6/2005 |
| EP | 0344749 A2 | 12/1989 |
| FR | 1239547 A | 8/1960 |
| RU | SU587845 A3 | 1/1978 |
| RU | SU1301459 A1 | 4/1987 |
| WO | WO2008140307 A1 | 11/2008 |

* cited by examiner

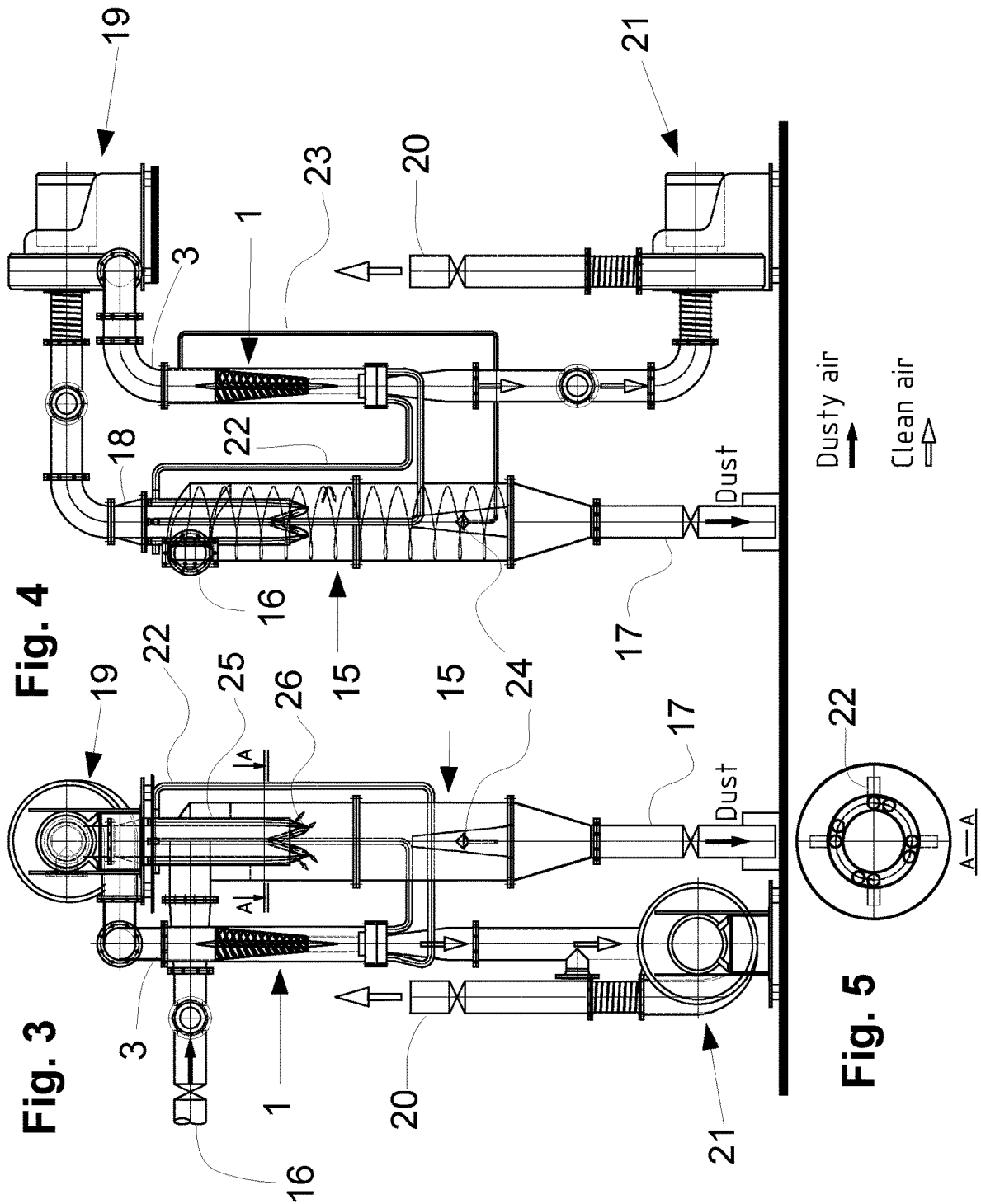

//*DEVICE AND METHOD FOR FLUID PURIFICATION*

TECHNICAL FIELD

The invention relates to the field of fluid purification. More specifically, the invention relates to a device for removing solid or liquid impurities from a fluid stream by means of centrifugal forces, and to a method for removing solid or liquid impurities from a fluid stream.

BACKGROUND

The removal of impurities from air is a long-existing problem, the importance of which is significantly growing due to the pollution problems of today. A basic technical solution for separating solid particles from a fluid stream is the cyclone.

For demanding air purification applications, developments on the cyclone concept are required. A variety of helical separators have been designed, comprising spiral channels within a gas conduit and outlets for solids-depleted and solids-enriched streams, respectively.

In EP 0 344 749 A2 is disclosed a separating device suitable for use in treating a particle containing gas stream to separate particles from a gas, or to clean the gas of particles. The device comprises an outer tube having an inlet end, a vortex-generating region and a separation region; and an inner extraction tube for conducting cleaned air out of the device. The vortex-generating region has a central core and helical blades arranged around the core, and is of constant diameter or diverging. The outer tube and the extraction tube are concentric, and between the tubes is an outlet port extending around a portion of the circumference. Particles in a feed stream entering the inlet end are set in a rotational motion, are carried to the periphery of the outer tube. A particle-enriched stream exits the outlet port while a particle-depleted stream exits through the extraction tube.

SUMMARY OF THE INVENTION

An object of the present invention is to provide a device for separating solid particles or liquid droplets from a fluid, in the following called "separator". The separator comprises an entry tube having an inlet port for receiving a fluid flow and a vortex section, the diameter of which decreases in the flow direction. The vortex section comprises at least one internal wall forming at least one helical channel. Preferably, the vortex section is conical, tapering off in the flow direction.

Preferably, the helical channel surrounds a core body extending along a central axis of the entry tube. The core body is at both ends of varying diameter, widening in the flow direction at the upstream end and narrowing in the flow direction at the downstream end. An intermediate section of the core body may be of constant diameter. In one embodiment the intermediate section of the core body may be diverging, preferably narrowing in the flow direction. The varying diameter end sections of the core body preferably have a conical shape.

The first end of the core body, widening in the flow direction, controls the incoming fluid comprising particles and droplets in a helical channel in a laminar manner, wherein the particles and droplets of the stream move in smooth parallel upstream layers without mixing with each other. The other end (final end) of the core body, narrowing in the flow direction, stabilizes the stream exiting from the helical channel towards the exit port section. Laminar flow and stabilization of the stream as it exits the helical channel is of particular importance in order to obtain the purified stream to enter the outlet tube and the solid-rich stream, in turn, to be directed to the exit opening(s) around the outlet tube.

Preferably, fluid guidance blades are connected to the helical channel at the upstream end of the core body. Such fluid guidance blades facilitate turning of the flow from vertical to rotational flow, thus helping the flow to settle and to reduce pressure lost.

The separator further comprises an annular exit port section having at least one peripheral exit opening, preferably a plurality of exit openings separated by wall portions; and an outlet tube extending along the central axis. Thus, the outlet tube is located next to or between the exit opening(s), i.e. in case of several exit openings those are located around the outlet tube. The expression annular in this context includes both bodies having a rotational symmetry and bodies not having a rotational symmetry.

The exit port section connects the entry tube to an outlet tube arranged coaxially with the entry tube. Preferably, the separator comprises, situated between the vortex section and the exit port section, a separation section which preferably essentially lacks internal structures. The separation section may have a constant diameter.

According to another embodiment, the separation section has a either a constant diameter or diverging diameter. Preferably, the separation section has a narrowing diameter.

The separator and its function are described below in the direction of flow of fluid through the device. In operation, fluid enters at the entry end of the entry tube, which may comprise an initial section of constant diameter. The fluid is conducted to the helical channel or channels, which is/are preferably arranged to spiral around a central core body throughout the length of the tapering vortex section. Solids suspended in the fluid stream are carried by centrifugal forces to the periphery of the helical channels as the fluid stream proceeds through the vortex section. At the outer wall of the vortex section may be provided one or several exit conduit(s) communicating with a helical channel. The exit conduit leaves the helical channel tangentially to the main tube, carrying a stream of fluid which has been enriched in suspended particles.

As the fluid stream leaves the vortex section, at least part of the suspended particles may have been removed through the optional tangential exit conduits. Next, if a separation section is provided, the fluid stream enters the separation section which preferably is of constant diameter essentially corresponding to the diameter of the outlet end of the vortex section. The particles are significantly enriched at the outer wall of the tube when leaving the vortex section and passing through the separation section.

Next, the fluid stream enters the exit port section, which includes a flange portion connecting the main tube to the central exit tube. The exit port section may comprise a single exit port, but preferably a number of exit ports separated by wall portions are evenly spaced around the periphery of the flange portion. A particle-enriched fraction of the fluid stream leaving the vortex section or the separation section leaves through the peripheral exit port(s).

The fraction of the fluid stream which does not leave through the peripheral exit ports is particle-depleted and leaves the separator through the coaxially arranged exit tube.

According to a further embodiment of the present invention, the separator is provided with a pre-separation unit in the form of a cyclone, preferably of the tangential-entry type. When references are made below to upper and lower parts of the cyclone, the assumption is that the cyclone is arranged in a position where its central axis is vertical, the inlet being in the upper portion and the outlet for separated particles or droplets at the bottom end. The pre-separation unit preferably has a basic structure in accordance with the conventional cyclone structure, comprising a cylindrical body with a main inlet at its upper section, a downward tapering, preferably conical bottom section and central, vertical main outlets for particulate matter downwards and fluid upwards.

According to a further embodiment, the cyclone comprises in addition to its primary inlet for a fluid containing solids or droplets, at least one secondary inlet channel in its upper portion. A secondary inlet channel may supply clean fluid. In an embodiment, at least one secondary inlet channel is connected to the separation section of the separator.

According to a further embodiment, the cyclone comprises, in addition to its primary outlet channel through which fluid leaves the cyclone upwards along the central axis, at least one secondary outlet channel in its lower portion. In an embodiment, the stream from this outlet channel leaves the apparatus and may be filtered or led to a dust trap before vented. In another embodiment, the stream from this outlet channel is introduced to the entry tube of the separator. This channel may further serve to control the pressure in the cyclone.

According to a further embodiment of the invention, the vortex section of the entry tube comprises at its outer wall at least one outlet port allowing a fraction of the stream which has been enriched in particles to leave the vortex section in a direction essentially tangential to the outer wall of the entry tube.

A preferable material for the device according to the invention is steel; if the operating conditions so require, stainless steel of various grades may be used. Polymer materials, possibly fiber reinforced, may also be used. Other possible materials are ceramics, products of powder metallurgy and coated steels.

A second object of the invention is a method for separating solid particles or liquid droplets from a fluid using a device according to the invention, comprising the steps of introducing a fluid stream containing solid particles or droplets into an entry tube comprising a vortex section having a diameter decreasing in the flow direction and at least one internal wall forming at least one helical channel around the core body; thereby setting the fluid stream into a swirling motion; removing a particle- or droplet-enriched fluid stream through at least one peripherally arranged exit port arranged in an exit port section downstream of the vortex section, and removing a particle- or droplet-depleted fluid stream through an outlet tube arranged coaxially with the entry tube.

In a preferable embodiment, the vortex section comprises a core body extending along a central axis, the core body having a first end widening in the flow direction; an intermediate section; and a second end narrowing in the flow direction.

BRIEF DESCRIPTION OF THE DRAWINGS

FIG. 3 is a schematic side view of a separator according to the invention combined with a cyclone pre-separator, FIG. 4 is another schematic side view of a separator according to the invention combined with a cyclone pre-separator, rotated 90 degrees around a vertical axis relative to FIG. 3, FIG. 5 is a top view according to section A-A as indicated in FIG. 3.

DETAILED DESCRIPTION

Figure 1:
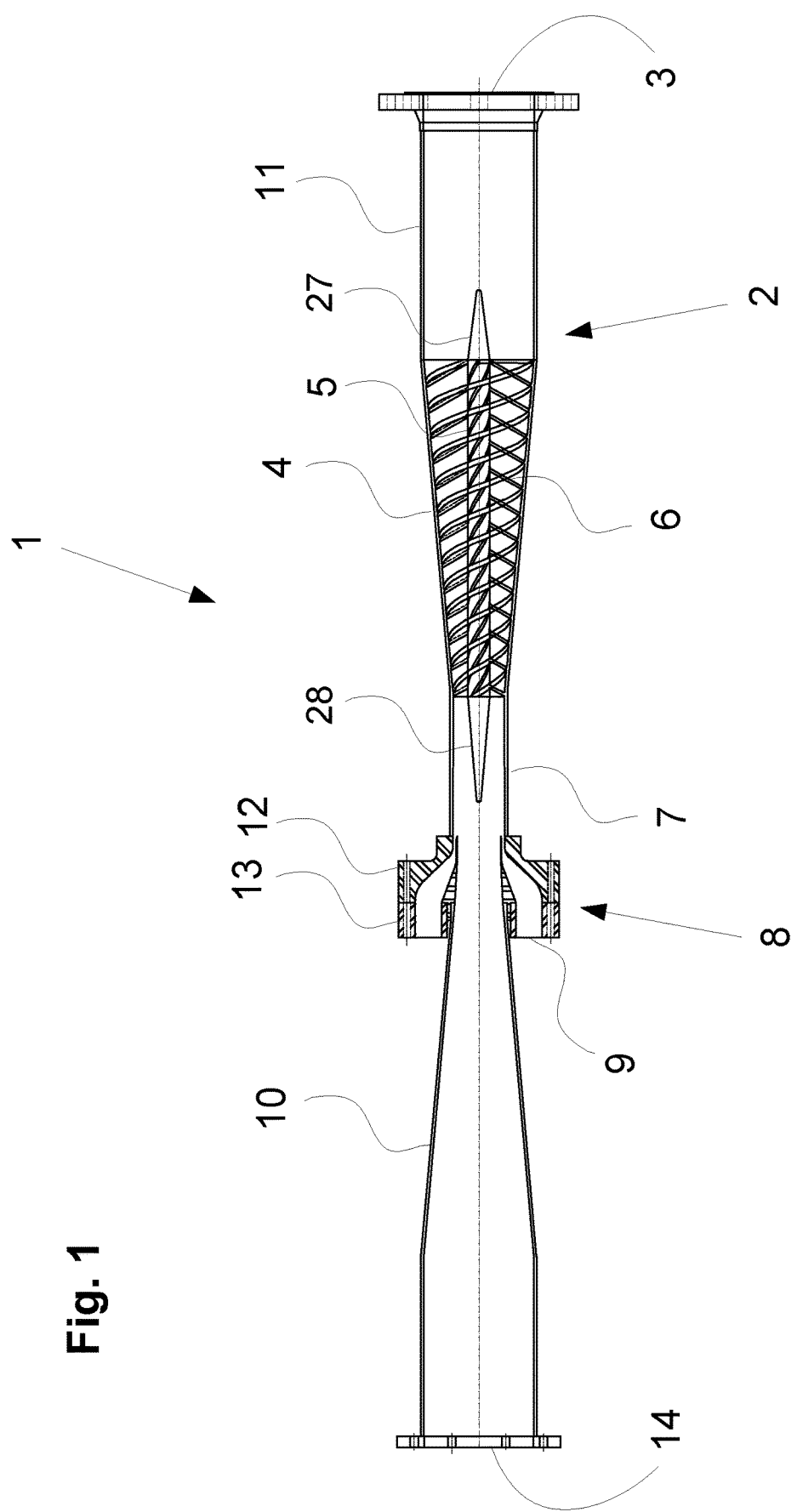
FIG. 1 is a schematic side sectional view of a separator according to the invention.

The invention will now be described in greater detail with reference to the attached drawings. The same structures are associated with the same reference numerals throughout.

In the present context the term "fluid" refers to any substance that is capable of flowing or deforming under an applied shear stress, or external force. Fluids comprise liquids, gases and plasmas. In particular the present invention is applicable for removing solid particles, such as dust, form gases (air) and solid particles from liquids.

With reference to FIG. 1, the separator operates as follows. A fluid stream containing particles or droplets, for example a gas stream containing solid particles, enters the entry tube 2 of separator 1 through inlet port 3. The separator shown has an initial section 11 with constant diameter. A vortex section 4 comprises a core body 5 extending into the initial section 11 and being surrounded by a structure comprising helical walls 6 forming helical channels filling the space between core body 5 and the inner surface of the wall of entry tube 2. The core body has a widening leading end 27 and a tapering trailing end 28. The vortex section 4 tapers in the direction of flow through the separator, leading to a rise in the fluid velocity as the fluid passes through the separator. There are at least one and preferably four spiral walls in the vortex section. The walls are preferably set at an angle in the range 60-90 degrees relative to the central axis of the entry tube. The distance between the walls, i.e. the width of the helical channels is preferably in the range 50 to 70 mm.

According to one embodiment the distance between the walls, i.e. the width of the helical channels is of constant diameter throughout the whole length of the vortex section. According to another preferred embodiment the width of the helical channels decreases in the flow direction.

In the vortex section, one or more outlet channels (not shown) leaving the helical channel in an essentially tangential direction may optionally be provided. These outlet channels remove partial streams in which the concentration of particles has risen due to the centrifugal forces caused by the helical path of the stream.

The length in the flow direction of the widening upstream end 27 of the core body 5 is preferably at least three times the distance between the helical walls 6. The length in the flow direction of the narrowing downstream end 28 of the core body 5 is preferably at least four times the distance between the helical walls 6.

The described preferred shape of the core body has the effect, that the leading end, widening in the flow direction, directs the incoming flow including particles or droplets, into the helical channel(s) in a laminar manner. The trailing end, narrowing in the flow direction, stabilizes the flow leaving the helical channel(s) to the periphery of the tube.

In the embodiment shown, the fluid stream exits the vortex section into a separation section 7, into which the trailing, tapering part of the core body 5 extends. As a consequence of the passing through the helical path of the vortex section, the stream is in a vigorous swirling motion, and particles are strongly concentrated at the periphery, i.e. adjacent the wall of the tube. Advantageously, the length of the separation section 7 is at least five times the distance between the spiral walls of the vortex section.

Figure 2:
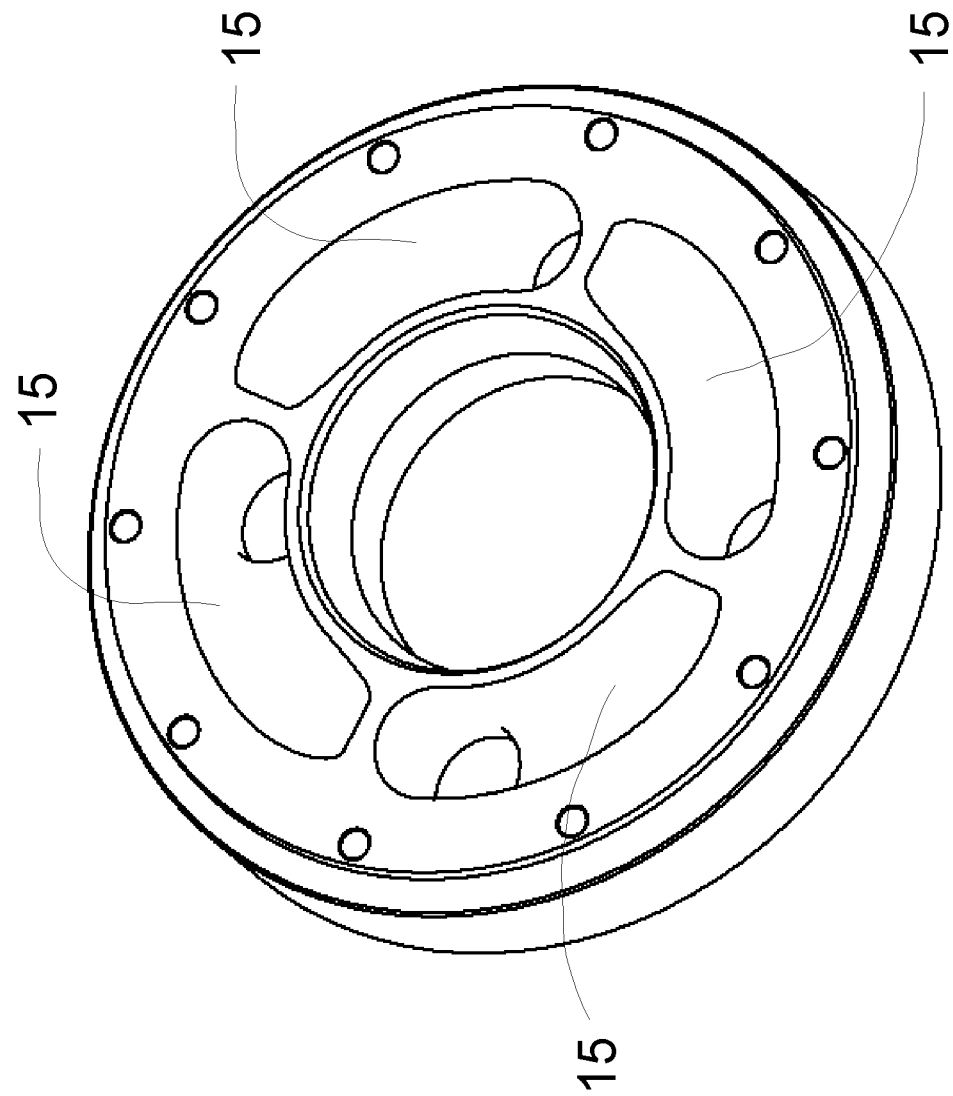
FIG. 2 is a perspective view of a flange part of the exit port section.

The particle-laden fraction then encounters the exit port section 8, which in the embodiment shown comprises a first flange portion 12 and a second flange portion 13 which are bolted together between respective end flanges (not indicated) of the entry tube 2 and the outlet tube 10. The structure of flange portion 13 is shown in FIG. 2. In this embodiment, the flange parts have four symmetrically arranged exit channels 15 which are set at an angle to receive the swirling flow adjacent the separation section inner wall.

Thus, flow fractions enriched in particles leave the separator through the exit ports 9 in exit port section 8 while the balance of the fluid, depleted of particles, enters the outlet tube 10 and leaves the separator through outlet 14. The outlet tube may be of constant diameter or widening in the flow direction. Preferably, the outlet tube has a conical shape widening in the flow direction.

FIGS. 3 and 4 show side sectional views of a separator 1 according to the present invention coupled to a cyclone pre-separator 15. FIG. 4 is rotated 90° around a vertical axis relative to FIG. 3.

In FIGS. 3 and 4, particle-containing fluid, here denoted "dusty air", enters at 16 and is introduced to the cyclone pre-separator 15, tangentially at the top of the cyclone as known in the art. The fluid stream is thus set into a spiral downward motion as schematically indicated by the spiral line in FIG. 4. Particles are enriched at the cyclone wall and leave at the bottom at 17.

The resulting pre-cleaned fluid stream leaves the cyclone in an upward motion through the vertical, central exit tube 18 and is transported to the inlet port 3 of separator 1 by means of primary blower 19. After passing through the separator 1 as set out in connection with FIG. 1, the cleaned flow is expelled at 20 by means of secondary blower 21.

In the embodiment shown, the particle-enriched fractions leaving the exit port section of the separator are recycled to the upper part of the cyclone pre-separator via lines 22. Preferably, the recycle lines 22 are arranged symmetrically in the rising tube 25 of the cyclone as shown in FIG. 5, which represents a view from above at the section A-A indicated in FIG. 3 (only one line 22 is provided with a reference numeral in FIG. 5).

Instead of recycled particle-enriched fluid from the separator, the lines 22 may feed supplemental, clean fluid into the cyclone pre-separator.

Figure 6:
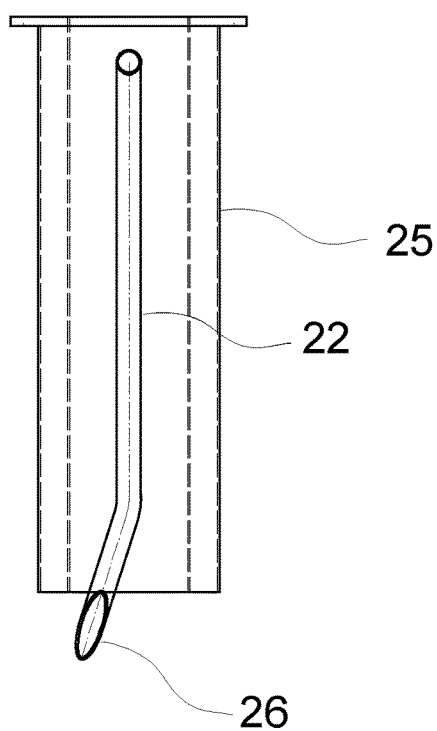
FIG. 6 is a detail side view of the internal structure of the cyclone pre-separator.

Preferably, lines 22 end in nozzles 26 directing the flow towards the inner surface of the cyclone wall, as shown in greater detail in connection with FIG. 6.

FIGS. 3 and 4 further show a secondary exit port at 24 in the lower part of cyclone pre-separator 15. From this exit port, line 23 conducts a secondary flow directly to the inlet of entry tube 2 of the separator. This arrangement lowers the pressure in the cyclone during operation and makes possible the separation of very fine particles. A preferable secondary flow is 10 to 20% of the fluid flow entering the cyclone. This arrangement considerably improves the performance of the cyclone.

Figure 7:
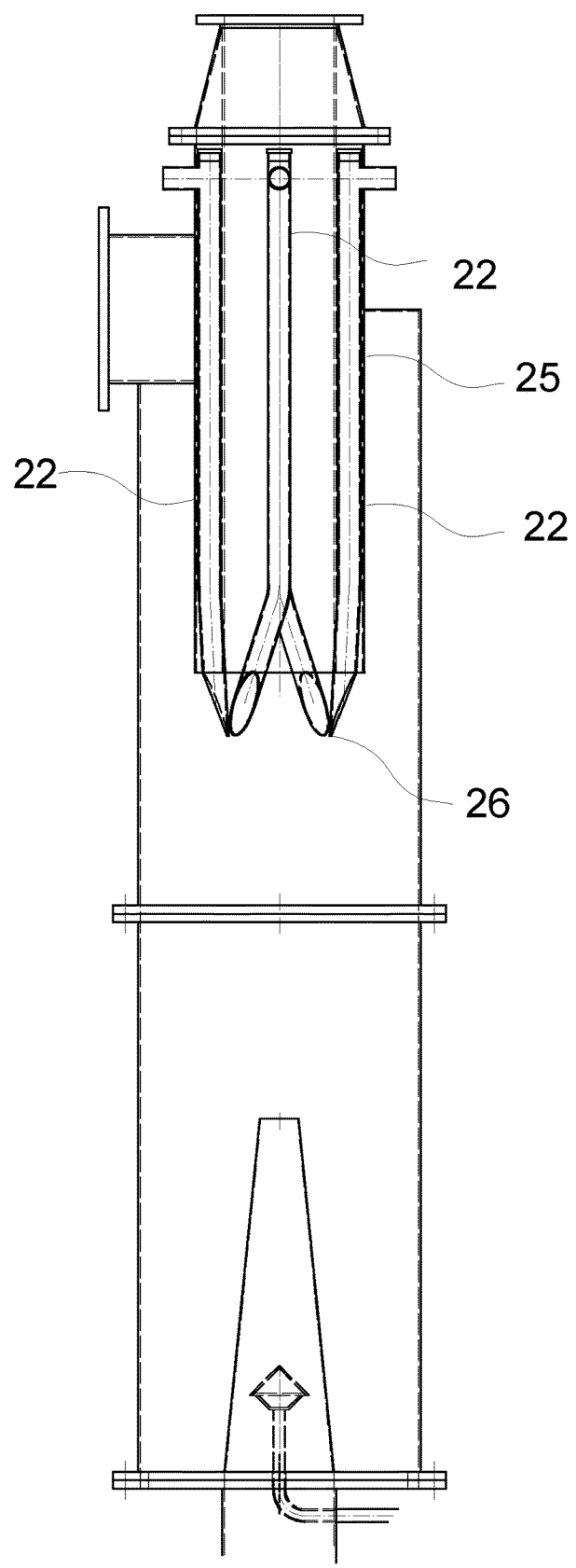
FIG. 7 is a side sectional view of the cyclone pre-separator.

FIG. 6 shows the arrangement of a single recycling line 22 with nozzle 26 fitted to rising tube 25 within the cyclone pre-separator. FIG. 7 is a side sectional view of a cyclone pre-separator with four recycle lines 22 and nozzles 26 mounted symmetrically around the cyclone rising tube 25. The nozzles 26 are directed to guide the recycled, particle-enriched flow from the separator exit port section into the downwardly spiraling flow at the cyclone wall.

Although not shown in the figures, instrumentation may be provided as the skilled person will realize. For example, control valves, pressure sensors and digital control equipment may be provided to control e.g. the secondary flow in line 23.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

The invention claimed is:

1. A device for separating solid particles from a fluid, comprising:
   an entry tube having:
      an inlet port for receiving an incoming fluid flow,
      a vortex section having a diameter decreasing in a flow direction through the vortex section, wherein the vortex section comprises at least one helical wall defining at least one helical channel, and wherein the vortex section comprises a core body extending along a central axis of the vortex section, the core body having a first end widening in the flow direction; a second end narrowing in the flow direction; and an intermediate section between the first end and the second end having a constant diameter;
   an annular exit port section having an annular body comprising at least one peripheral exit opening in the annular body, and
   an outlet tube arranged coaxially with the entry tube,
   wherein the annular exit port section connects the entry tube to the outlet tube.

2. The device according to claim 1, wherein the entry tube further comprises a separation section between the vortex section and the annular exit port section.

3. The device according to claim 1, wherein the at least one helical wall defines at least one helical channel in the vortex section, and wherein the at least one helical wall is set at an angle in the range 60-90 degrees relative to the central axis of the entry tube.

4. The device according to claim 3, wherein a width of the at least one helical channel decreases in the flow direction.

5. The device according to claim 1, wherein fluid guidance blades are connected to the at least one helical channel at an upstream end of the core body.

6. The device according to claim 1, wherein the at least one helical wall comprises a plurality of helical walls, and wherein a length of the first end of the core body widening in the flow direction is least three times the distance between the helical walls.

7. The device according to claim 1, wherein the at least one helical wall comprises a plurality of helical walls, and wherein the length of the second end of the core body narrowing in the flow direction is least four times the distance between the helical walls.

8. The device according to claim 1, further comprising a plurality of exit ports in the exit port section.

9. The device according to claim 1, further comprising a cyclone connected upstream from the entry tube.

10. The device according to claim 9, further comprising at least one secondary inlet conduit in an upper part of the cyclone.

11. The device according to claim 9, further comprising at least one secondary outlet conduit in the lower part of the cyclone.

12. A method for separating solid particles or liquid droplets from a fluid, comprising the steps of:
   introducing a fluid stream containing solid particles or droplets into an entry tube comprising a vortex section having a diameter decreasing in a flow direction through the vortex section and having at least one helical wall defining at least one helical channel, thereby setting the fluid stream into a swirling motion, wherein the vortex section comprises a core body extending along its central axis, the core body having a first end widening in the flow direction; a second end narrowing in the flow direction; and an intermediate section between the first end and the second end having a constant diameter;
   removing a particle- or droplet-enriched fluid stream through at least one peripherally arranged exit port in an annular body of an annular exit port section downstream of the vortex section; and
   removing a particle- or droplet-depleted fluid stream through an outlet tube arranged coaxially with the entry tube.

13. The method according to claim 12, further comprising the step of passing the fluid stream through a cyclone prior to the introduction to the entry tube.

14. The method according to claim 13, further comprising the step of removing a secondary fluid stream from the lower part of the cyclone.

* * * * *